Figure 1:
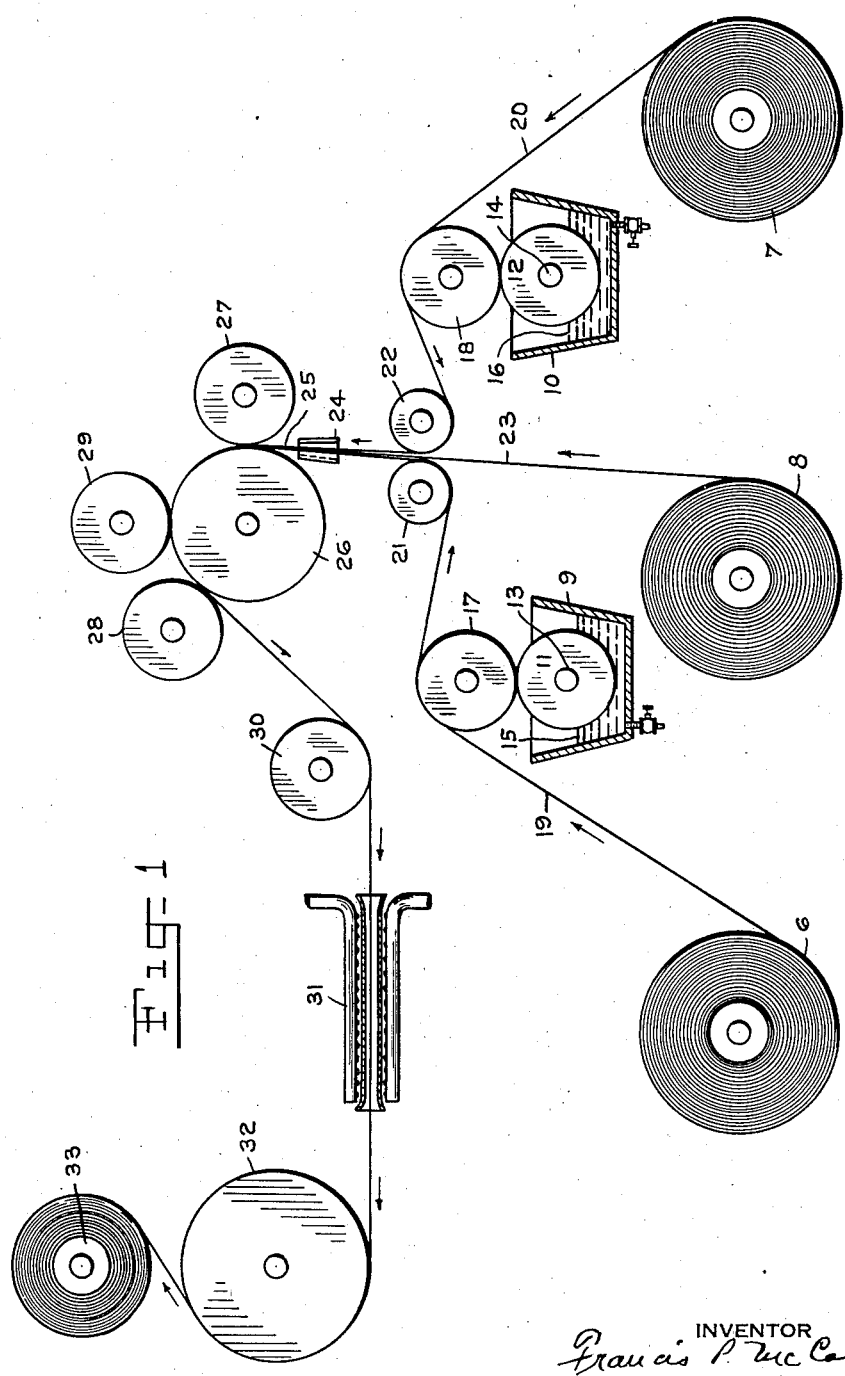

July 16, 1935.  F. P. McCOLL  2,008,218
MOISTUREPROOFING
Filed Nov. 7, 1933  11 Sheets-Sheet 1

INVENTOR
Francis P. McColl
BY
ATTORNEY

July 16, 1935. F. P. McCOLL 2,008,218
MOISTUREPROOFING
Filed Nov. 7, 1933 11 Sheets-Sheet 2

INVENTOR
Francis P. McColl
BY
ATTORNEY

July 16, 1935.　　　　F. P. McCOLL　　　　2,008,218
MOISTUREPROOFING
Filed Nov. 7, 1933　　　11 Sheets-Sheet 3

INVENTOR
Francis P. McColl
BY
ATTORNEY

July 16, 1935.　　　　F. P. McCOLL　　　　2,008,218
MOISTUREPROOFING
Filed Nov. 7, 1933　　　11 Sheets-Sheet 4

INVENTOR
Francis P. McColl
BY
ATTORNEY

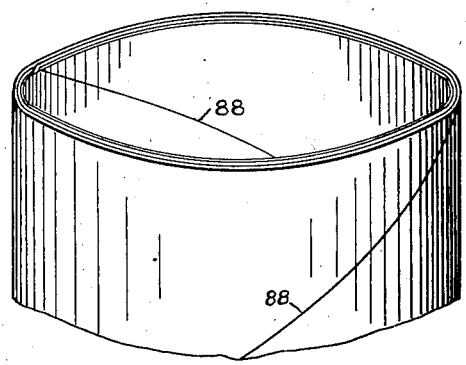
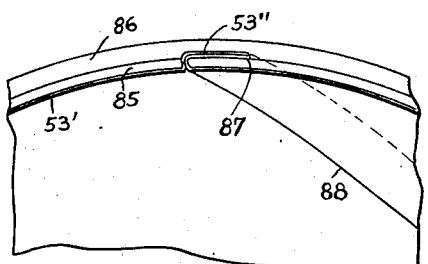
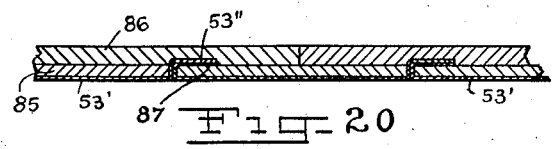
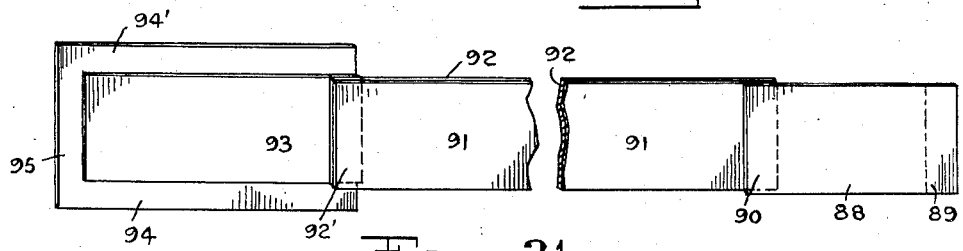
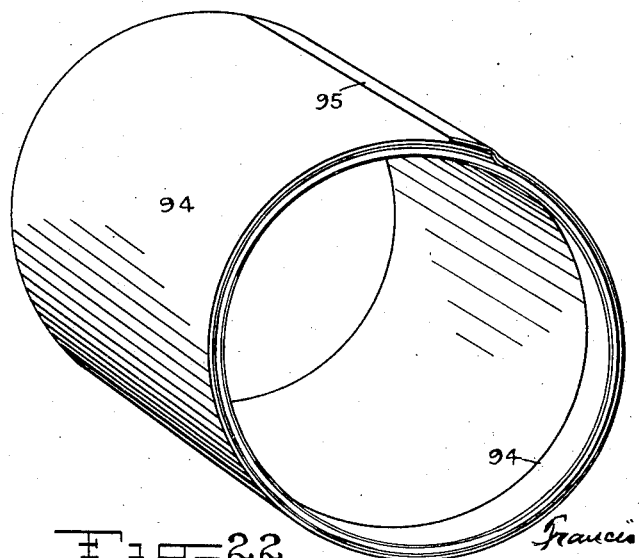

July 16, 1935.  F. P. McCOLL  2,008,218
MOISTUREPROOFING
Filed Nov. 7, 1933  11 Sheets-Sheet 6
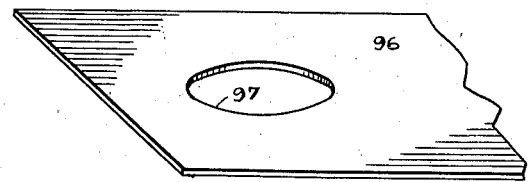
Fig. 23
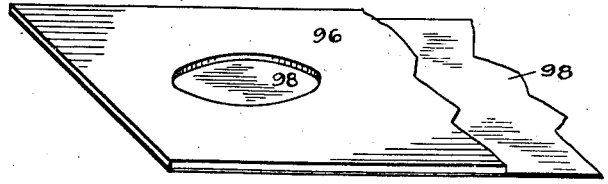
Fig. 24
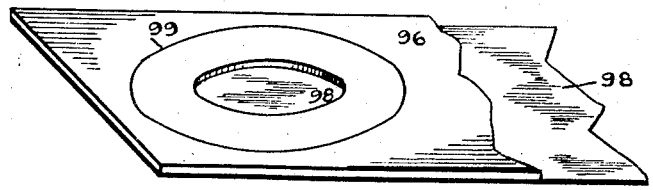
Fig. 25
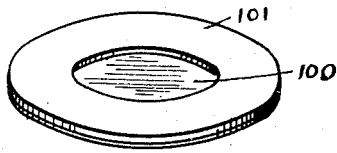
Fig. 26
Fig. 27
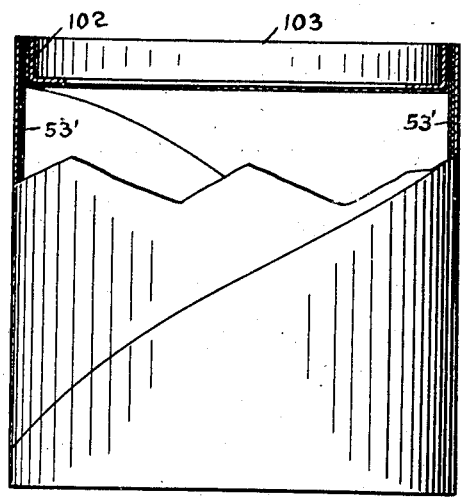
Fig. 28
Francis P. McColl INVENTOR
BY Thompson & Hill
ATTORNEY July 16, 1935.  F. P. McCOLL  2,008,218
MOISTUREPROOFING
Filed Nov. 7, 1933  11 Sheets-Sheet 7
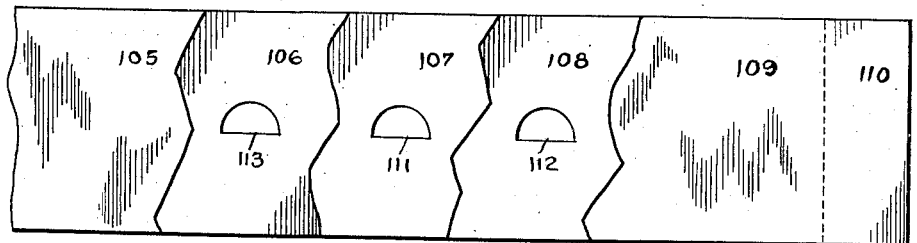
Fig. 29
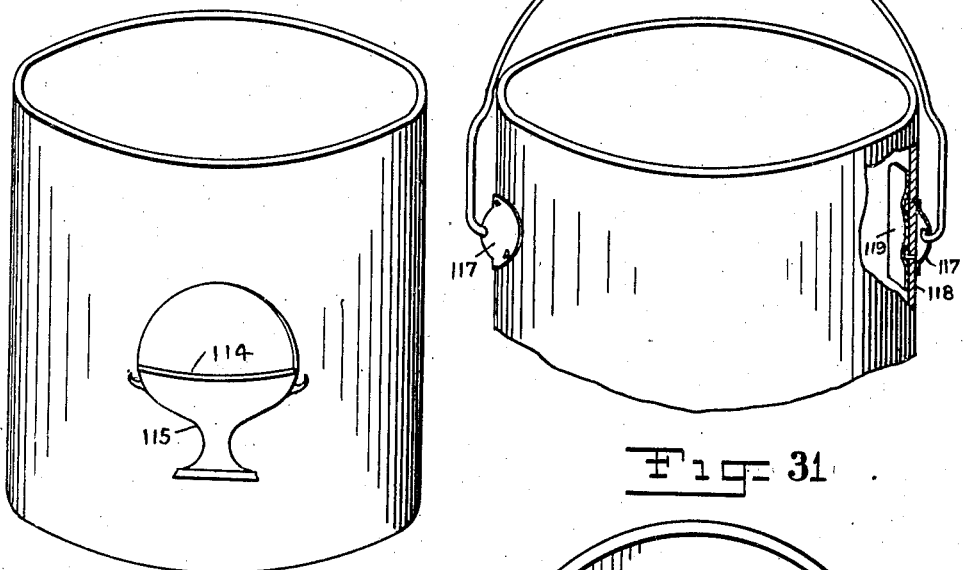
Fig. 30
Fig. 31
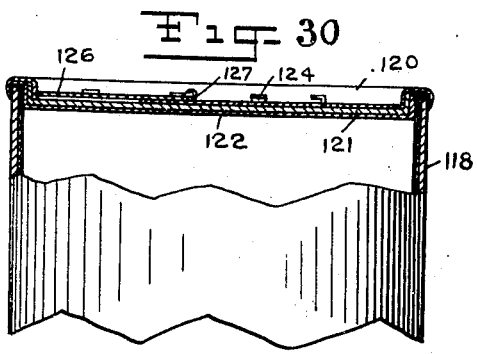
Fig. 32
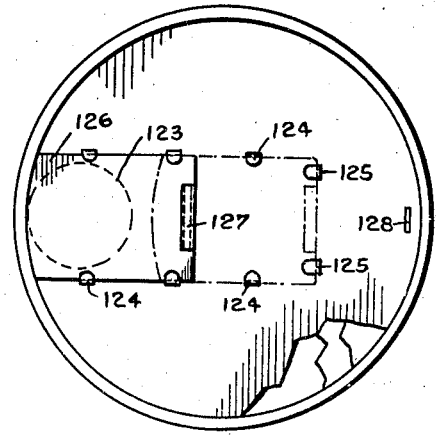
Fig. 33
INVENTOR
Francis P. McColl
BY
Thompson Hill
ATTORNEY July 16, 1935.   F. P. McCOLL   2,008,218
MOISTUREPROOFING
Filed Nov. 7, 1933   11 Sheets-Sheet 8
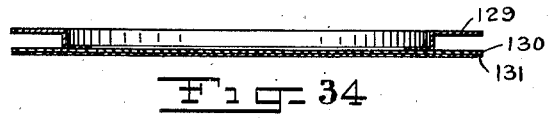
Fig-34
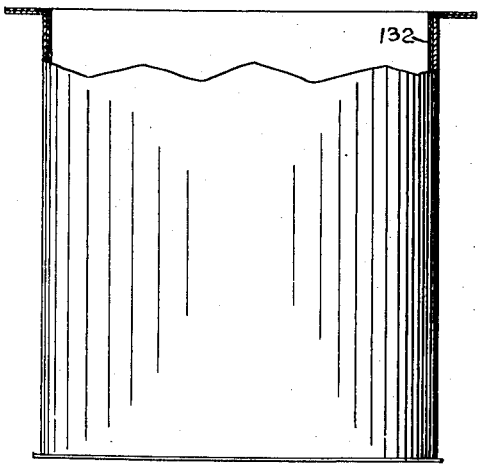
Fig-35
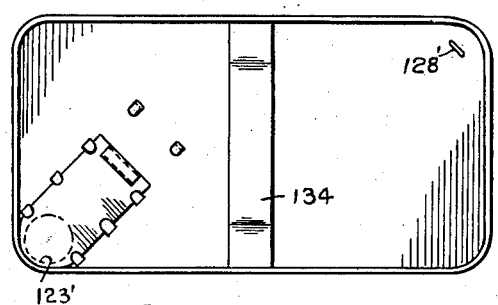
Fig-36
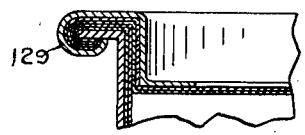
Fig-38
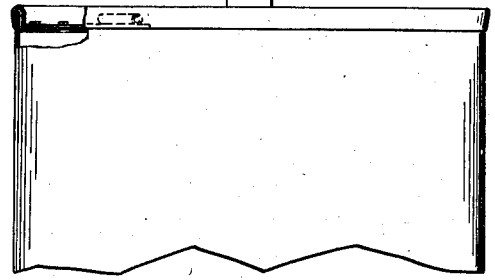
Fig-37
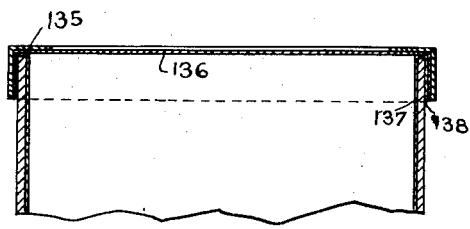
Fig-39   Fig-40
INVENTOR
Francis P. McColl
BY
Thompson Hill
ATTORNEY July 16, 1935.    F. P. McCOLL    2,008,218
MOISTUREPROOFING
Filed Nov. 7, 1933    11 Sheets-Sheet 9

INVENTOR
Francis P. McColl
BY
Thompson Hill
ATTORNEY

July 16, 1935.  F. P. McCOLL  2,008,218
MOISTUREPROOFING
Filed Nov. 7, 1933    11 Sheets-Sheet 10

INVENTOR
Francis P. McColl
BY
Thompson Hill
ATTORNEY

July 16, 1935.  F. P. McCOLL  2,008,218
MOISTUREPROOFING
Filed Nov. 7, 1933  11 Sheets-Sheet 11
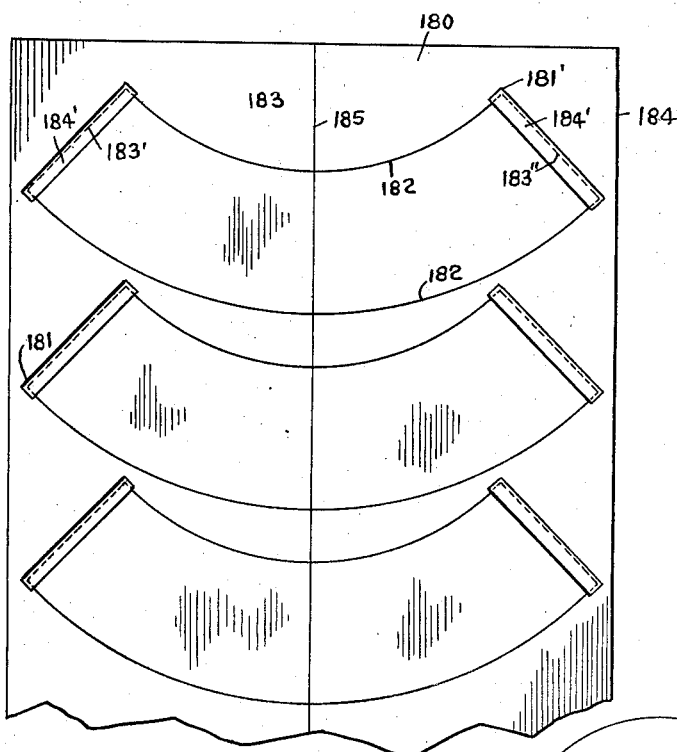
Fig. 49
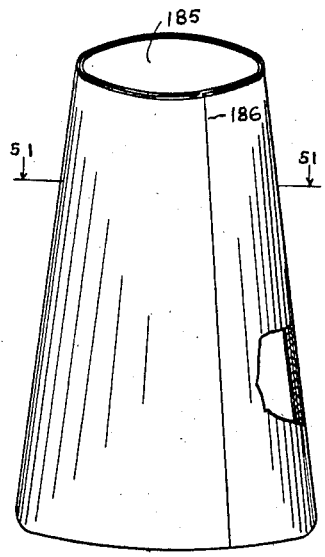
Fig. 50
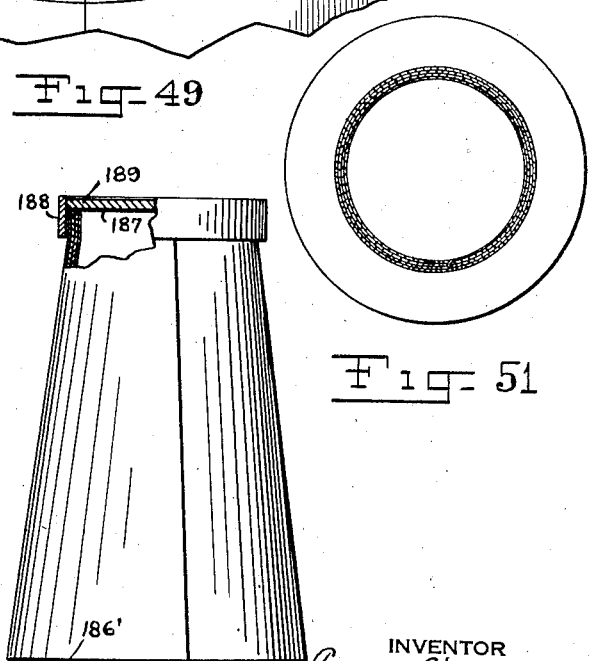
Fig. 51
Fig. 52
INVENTOR
Francis P. McColl
BY
Thompson O'Neil.
ATTORNEY Patented July 16, 1935

2,008,218

UNITED STATES PATENT OFFICE 2,008,218

MOISTUREPROOFING

Francis P. McColl, Ridgewood, N. J.

Application November 7, 1933, Serial No. 697,011

9 Claims. (Cl. 93—36)

My invention relates to improvements in laminating or coating paper, card, or other material, or containers of the same by cellulose or other substantially moisture-proof materials, preferably transparent, and has especially to do with, and is illustrated in the accompanying drawings in its application to the moisture-proofing and formation of containers such as paper cans, and more particularly, has reference to means for laminating sheets of material for lining, and covering in some instances, the exterior as well as the interior of such container, thus providing an inner or outer covering, coating or lamination of substantially non-porous, and preferably transparent material, and in some instances, the container is provided between the body of the container and the covering with a sheet of material such as paper, sometimes colored, producing the effect of enameling, and involves the sealing, fusing, or hermetical binding of the walls of the container and laminations where the same join, such as at the seams or laps, thus in most instances forming a complete unitary, substantially moisture-proof container within an outer more or less moisture-proof shell or container, and this application is in part a renewal or continuation of my previous application, S. N. 596,284, allowed September 28th, 1932.

Figure 2:
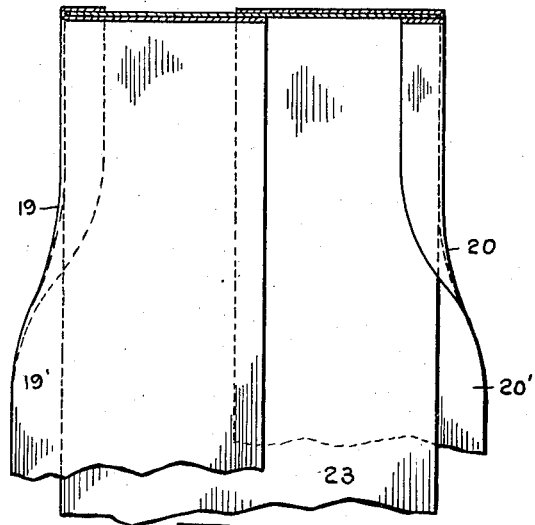
Figure 4:
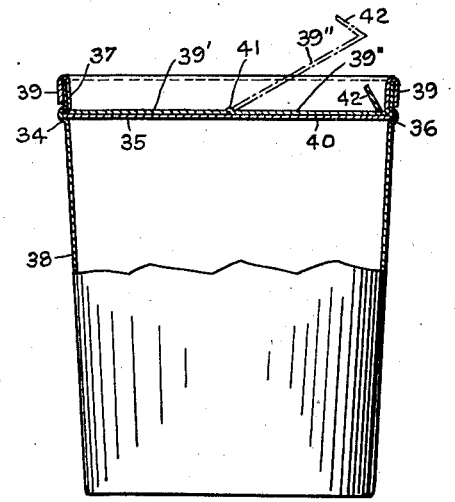
Figure 3:
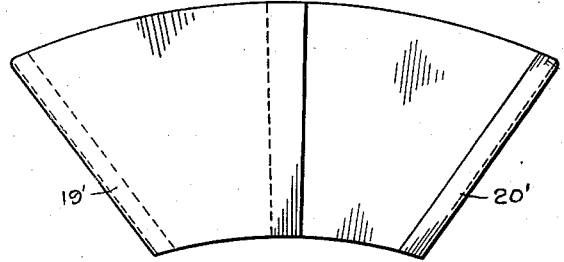
Figure 5:
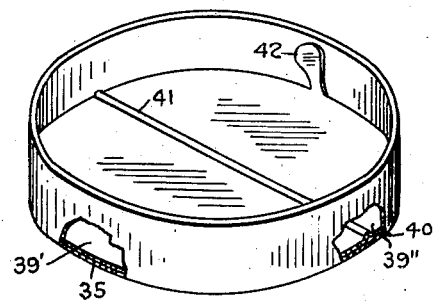
Figure 6:
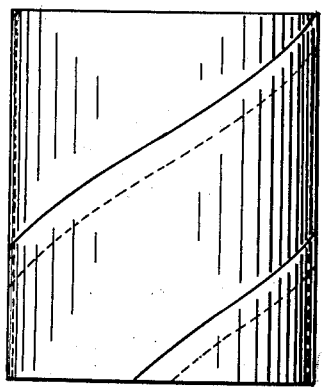
Figure 9:
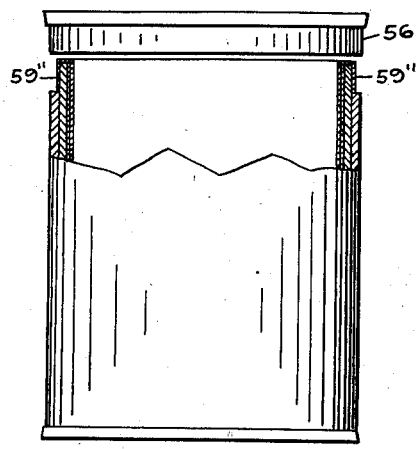
Figure 7:
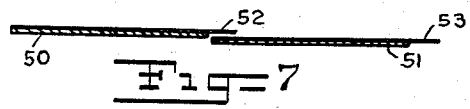
Figure 8:
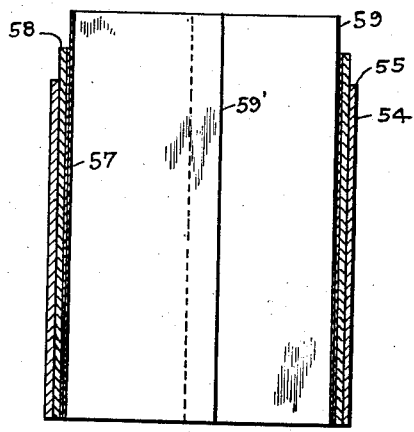
Figure 10:
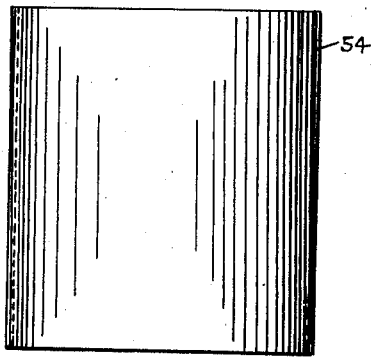
Figure 11:
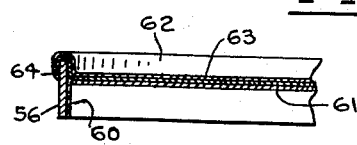
Figure 12:
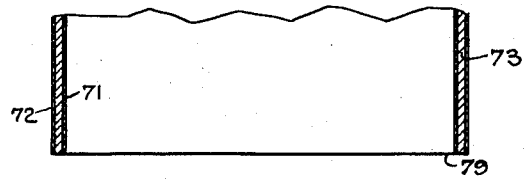
Figure 13:
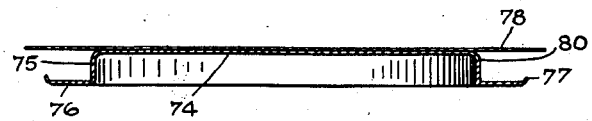
Figure 14:
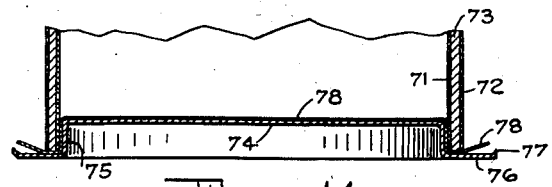
Figure 15:
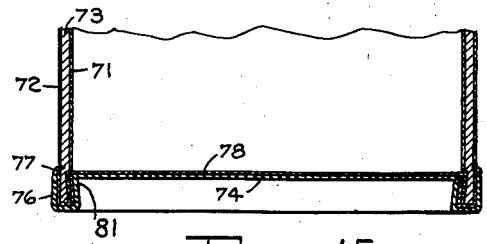
Figure 16:
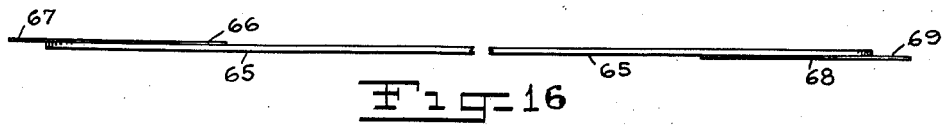
Figure 17:
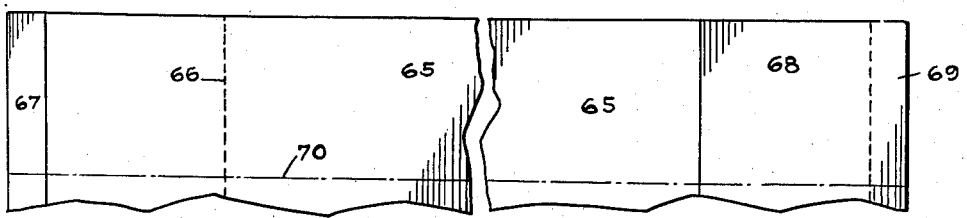
Figure 47:
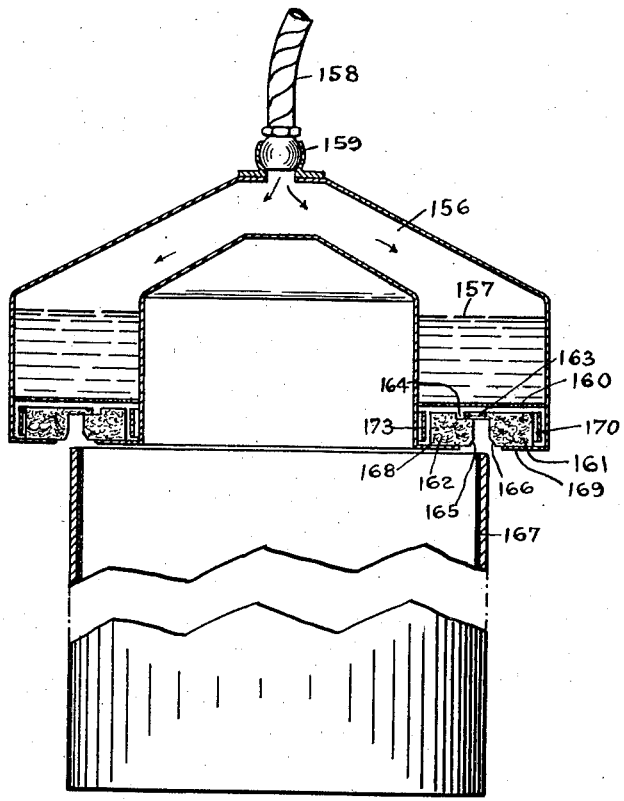
Figure 48:
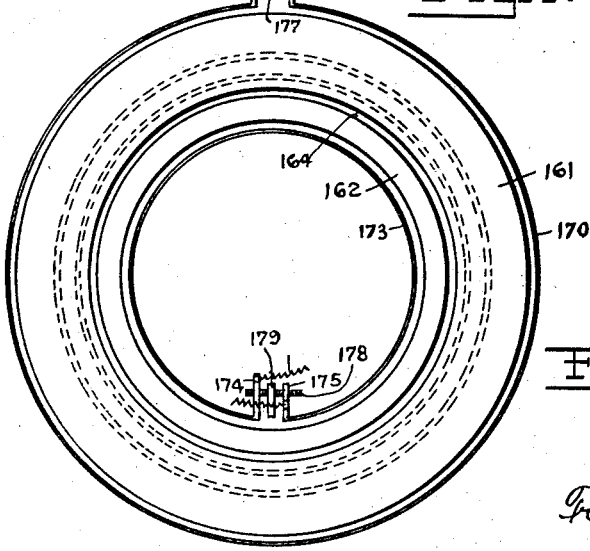

Referring to the accompanying drawings, I have diagrammatically illustrated in Fig. 1, in side elevation, a suitable arrangement of mechanism for laminating card or paper stock with cellulose, or similar material. Fig. 2 shows a strip of card or paper in the process of being laminated. Fig. 3 shows a laminated blank of a form adapted for a wall of a conical container. Fig. 4 illustrates in side elevation, partly in section, a modified form of conical container, showing the application of a suitable cover or top therefor. Fig. 5 illustrates in perspective, parts broken away, a suitable form of cap or top, such as illustrated in Fig. 4. Fig. 6 illustrates in elevation, a modified form of container body made of spirally wound strips, and laminated or covered with spirally wound, overlapping (at the margins) non-porous material. Fig. 7 shows a cross-section and positioning of such material during the winding operation. Fig. 8 is a vertical longitudinal section of the body portion of a concentric tube container, Fig. 9 is an elevation partly broken away, and part in section, showing further details of the container shown in Fig. 8, with the cover therefor, Fig. 10 illustrates in elevation, the outer body portion of the container shown in Fig. 8. Fig. 11 illustrates one of the heads or covers of such a container in cross section, parts being broken away, Fig. 12 illustrates the lower portion of the body of a suitable form of container, and Fig. 13 one of the heads therefor in cross section and in process of formation. Fig. 14 illustrates the body portion shown in Fig. 12, and the head shown in Fig. 13 in more developed assembly relation, Fig. 15 shows the same in final assembly relation, Fig. 16 is a side view of a preformed strip of card with non-porous inner lining and outer label attached in continuous form for winding into a container such as shown in Figs. 12 to 15 inclusive, Fig. 17 illustrates the same in plan view, Fig. 18 illustrates the upper portion in perspective of a spirally wound container, and Fig. 19 a broken section of the same illustrating the method of overlapping or inter-lapping the adjacent margins of the lining material. Fig. 20 illustrates a cross-section of the same, Fig. 21 illustrates in perspective an arrangement of body material, label and linings for straight winding, Fig. 22 is a perspective view of the body of a can made with a composite strip arranged substantially as shown in Fig. 21, and Fig. 23 illustrates in perspective a strip of card, tin or other material, with a hole perforated therethrough. Fig. 24 is a similar view of the material shown in Figure 23 covered at one side with a suitable, preferably transparent, non-porous material, Fig. 25 illustrates the assembly shown in Fig. 24 with the outer line indicating where both thicknesses are cut through as a composite disc, Fig. 26 illustrates such a disc, Fig. 27 illustrates the same formed as a cover or head, and Fig. 28 illustrates the same as applied to a suitable form of container. Fig. 29 illustrates in plan view a built-up or composite strip for forming into the cylinder body portion of a container, Fig. 30 illustrates in perspective a "window" form of can, Fig. 31 a suitable form of paper can with a bail or handle in perspective, Fig. 32 the upper part in side elevation, of a can partly in section illustrating a slide, cover and perforatable head, and Fig. 33 a plan view looking down thereat. Fig. 34 a modified form of laminated head, Fig. 35 a side elevation of a can with the head shown in Fig. 34 applied in section. Fig. 36 a top plan view of a substantially rectangular form of can with perforatable head and slide, Fig. 37 a side elevation of the same partly broken away, Fig. 38 a broken section of a form of paper can showing the method of seaming the head thereto, and Fig. 39 a modification of the form shown in Fig. 38. Fig. 40 a longitudinal section of a can and transparent head showing a method of combining the same, Fig. 41 a plan view of a slide top perforatable head, Fig. 42 a similar view with the slide removed, Fig. 43 a bail support or hanger, Fig. 44 a covered can in side elevation showing a suitable application of the bail hanger shown in Fig. 43, Fig. 45 a sectional view of the perforatable slide cover top shown in Figs. 41 and 42, Fig. 46 a plan view of a can head illustrating the method of vacuum sealing the same, Fig. 47 illustrates a suitable moistening device for wetting the top sides and top edge of a paper can preliminary to applying the head thereto, and Fig. 48 a plan view of such moistening device, and Figs. 49 to 52 illustrate modifications.

Referring now more particularly to Figs. 1, 6 and 7, the same illustrate rolls of very thin cellulose or other suitable non-porous, preferably transparent material, and 8 indicates a similar roll of paper stock or card to be laminated or covered with the transparent, non-porous material, 9, 10 indicate troughs of metholcellosolve, a solvent for the cellulose, containing rosin, gum, acetate, and sometimes other ingredients, which may be used as a solvent, cement or adhesive for sticking or fastening the cellulose sheet to the card or board, and to itself where the same overlaps. Such a solution may be made up as follows: heavy acetate, 75 parts and metholcellosolve 50 parts, to which may be added 5 parts of gum or 73 parts of acetate may be used to 10 parts of a suitable gum with 15 parts metholcellosolve. In any case, the adhesive or binder preferably is such that it has some dissolving effect so that the margin of the cellulose where overlapped is actually united, bonded and hermetically attached, thus forming an integral or continuous piece, while at the same time it serves as a filler and an adhesive.

11, 12 indicate rollers upon shafts 13, 14 adapted to rotate within the troughs 9, 10, and in the solution referred to, said solution being indicated by the reference characters 15, 16, and 17, 18 indicate rollers similarly mounted and contacting with the partially immersed rollers 11, 12, as shown, to pick up and take the adhesive, and pass it to the undersurface of the strips or webs of cellulose, 19, 20, as the same pass over the rollers as shown, and beneath the rollers 21, 22. In passing between said rollers last mentioned, the adhesive covered faces of the strips of cellulose, 19, 20 pass against the strip of card or board 23, as shown, the cellulose being thereby applied uniformly, flatly and smoothly upon the card, fastening thereto.

By reference now more particularly to Fig. 2, it will be observed that the width of the cellulose strips is less than the width of the card or paper 23, and that the inner margins of the cellulose strips at opposite faces of the card overlap (with the card or board between) as shown at Fig. 2, while the outer margins thereof at opposite faces and opposite sides of the card or board, extend beyond the board or card.

Referring now again to Fig. 1, I have indicated at 24, a suitable folder or seamer of any desirable shape such as is well-known in the paper folding arts, so that as the composite strip 25 feeds through the same with the marginal portion 19' and 20' of cellulose extending, said marginal portions are preferably folded or laid over the card or board on the opposite faces thereof while the composite strip is pressed between the rollers 26, 27, and pressed beneath the rollers 28, 29, upon the roller 26, passing downwardly beneath the roller 30 to the heater 31 of any suitable form, where the composite strip is finally dried and set, after which it passes over the roller 32, and is wound upon the take-up roll 33, which may now be used for forming cylindrical containers such as paper cans, and, of course it will be readily understood that tin-plate or other material may be used instead of card or paper, if desired.

Where a tapered container is desired, a blank is cut and formed, substantially as shown in Fig. 3, instead of having straight parallel sides as shown in Fig. 2. Such a form of container is illustrated in Fig. 4, of slightly modified taper, and is formed by rolling one end of the blank shown in Fig. 3 within the other, until the lateral margins overlap, whereupon the inner and outer walls of the cone thus formed will be found to be entirely covered with the transparent material, and the overlapping margins may then be cemented or bonded together, thus forming a tapered or cone-like tube, having a substantially continuous inner and outer wall or lamination of substantially water-proof and transparent material.

A container similarly formed, as shown in Fig. 4 is preferably provided adjacent one end with an annular outwardly projecting channel or bead 34, and a cap such as 35 may also be provided, such cap being illustrated in Fig. 5, and adapted when inserted into the top of the container to rest upon the base of the channel or annular recess 34 or, the bottom of the cap may be beaded outwardly at the base as indicated at 36, to force into the annular recess 34, if desired. In any case, the side wall or flange 37 of the cap extends upwardly beyond the top of the wall of the container 38, and is turned over as indicated at 39, said cap being of course preferably laminated with the same material as the container, a suitable adhesive being applied to hermetically bond or seal the same when in position. 39' indicates a disc of card or paper between which, and the bottom 35 of the cap, is preferably provided a disc 40 of the same laminating material, the disc 39' being fastened to the intervening disc 40 of cellulose around one half of the disc, the half at the right shown in Fig. 4 being free so that the upper half 39'' may be lifted clear of the bottom of the cap, and to facilitate such operation, a transverse score line 41 is provided, and also preferably a tongue 42, so that when it is desired to get at the contents of the can or container, the tongue 42 is gripped between the fingers, lifting the free half 39'' of the disc, after which a knife or other instrument can be run around the edge of the right half of the bottom 40 of the cap, thereby cutting the same free, so that it can be depressed or pulled out to get at the contents of the can or, if desired, the two halves at the right may be bonded together in the usual manner so that when the knife is run around the edge, the two halves may be lifted together by the tongue 42, thus giving access to the contents.

As an adhesive, I may dissolve rosin in dibutylphthylate or, I may use ester gum in place of the rosin,—about seventy-five parts of the gum to about twenty-five parts dibutylphthylate, which can be thinned by heating.

In the modification shown in Figs. 6 and 7, the spirally wound form of tube for the container is shown, the paper strips to be wound being indicated by the reference characters 50, 51. These are laminated with the non-porous transparent material 52, 53, so that the extending margin of one strip 52, overlaps the margin of the adjacent strip 53, to which it is preferably fused by a solvent, thus forming upon the inside of the container, a continuous, integral, hermetically sealed wall. Upon the outside of this container may of course be also secured an outer cylinder 54, shown to advantage in Fig. 10, the same being shorter in length to provide a seating 55, for the cap or top shown at 56. Also instead of winding the lining or lamination such as illustrated at 52, 53, a tube of similar cellulose or other suitable material such as 57, may be formed with a longitudinally extending seam or overlap 59', suitably fused or fastened, and may extend above the top 58 of the body portion of the container, so as to be turned down as indicated at 59'', where it may be suitably secured to the wall as shown. The cap 56, being suitably lined with similar material, may now be pressed down over the top of the container, seating upon the top edge 55 of the outer container 54, and the contacting faces of the cellulose having been previously wiped with the solvent, will now fuse, forming a continuous lining throughout the interior wall and head of the container. A broken section of the cover 56 is shown to advantage in Fig. 11 where it will be seen that the inner lining 60 extends under the top or head as indicated at 61 and down the side wall, being secured adjacent metal cap 62 with an intervening disc such as 63 beneath the cap, which is preferably clinched around the side as indicated at 64.

Referring now more particularly to Figs. 12 to 17 inclusive, it will be observed, especially by reference to the latter figure, that a long strip of card 65 may be prepared with a piece of cellulose 66 at one side upon the under face, with an extending marginal portion 67 as shown, and at the opposite side of the strip of card 65 may be provided a strip of labels 68 on the upper face with extending margin 69. This composite sheet may be cut along the line 70, according to the height of the can or container to be made, so that each strip for each container contains the moisture-proof strip 66, 67, which is rolled inside the coil, and the label 68, 69, on the opposite side and opposite face of the strip, forms the outside of the coiled cylinder or body portion of the container to be formed. The free margin 67 is fused to the opposite end 66 by overlapping the same thereupon, and the free end 69 of the label 68 is overlapped upon itself and fastened thereto by suitable adhesion after the wall of the container has been formed. The paper or card 65 may be of any suitable cheap grade of material sufficient for the necessary body and strength of the container, thus forming a cylinder having a non-porous lining with an outer label and, if desired, a piece of colored paper may be laminated between the non-porous strip 66, 67 to show color therethrough, giving in effect an enameled appearance for the interior of the container, while at the same time minimizing the amount of absorption by the surface to which the film is fastened. Also, it will be readily understood, that the label 68, 69 may be covered with a suitable film of non-porous and transparent material, thus protecting the printing thereon and producing an outer highly polished surface, much superior to ordinary high-class labels. The strips for forming successive cylinders of predetermined length, cut from the composite strip along the line 70, may be supplied in bundles and successively fed to the forming mandrel of the tube-making machine, or may be fed from the continuous strip and cut off as required for forming into cylinders.

The form of cylinder shown in Fig. 12 is provided with a suitable inner lining 71, and an outer label or covering 72, the intervening body of the wall being indicated at 73. A suitable head, covering or end for this container is illustrated in Fig. 13, the same being preferably formed of metal such as tin, having an upwardly domed central portion 74, with side wall 75, and base flange 76, preferably terminating in a peripheral inwardly turned portion 77. 78 indicates a disc of non-porous material, and the outer diameter of the wall 75 is very slightly greater than the internal diameter of the body shown in Fig. 12, so that as the head and body portion are pressed together, the lower, inner edge 79 of the wall strikes the rounded shoulder 80 of the head or end, carrying the margin of the disc 78 down tightly, squeezing the same against the wall 75, and a suitable solvent having been first applied to the upper marginal surface of the disc 78, or base of the lining 71 and inner wall 73, causes the fusion of the margin of the disc 78 and lining 71 entirely around the container, the same being now in the position shown in Fig. 14. The next operation brings the remaining portion of the moistened base flange 76 upwardly, and the peripheral portion 77 is now forced against the outer wall of the container, while at the same time, the wall 75 is now preferably pressed outwardly at the shoulder 80, as indicated at 81, thus slightly restricting the container wall at that point, while the inturned portion 77 further restricts it adjacent the same point, thus inter-locking the wall of the container to the head, making a secure, immovable fastening, while at the same time providing a continuous, integral, inner lining of non-porous material within the outer body portion of the card or other material, it being understood that a head or end similar to that shown is, of course, applied at the opposite end of the body portion, or a head or cap such as shown in Figs. 9 and 11. A removable cap without the restricting elements 77 and 81 may also be so formed, and may be sealed to the container by applying solvent between adjacent faces of the cap lining at 78 and wall lining at 71.

It has been found that this method of moisture-proofing a container is much more economical and certain than by spraying the interior of the container with the non-porous material in liquid form,—first, for the reason that more non-porous material would have to be used as a solution, and the same being usually volatile, further losses occur in that manner, while at the same time, the greater amount of volatile and inflammable material employed increases the fire risk. Furthermore, it has been found extremely difficult to insure a proper uniform distribution of the sprayed material, usually requiring that the paper or cardboard be first treated with a filler, which in turn tends to minimize the adhesion of the sprayed material, due to a minimization of the fibres exposed to be acted upon. Also it has been found practically impossible to properly apply the material at the seams, such as where the head joins the body portion, and necessitates a pretreatment such as with solvent or sealing agent—at that point between the head lining and the wall lining, whereas, when laminating or covering with preformed sheet material, an extremely thin web or film of material may be used, even as thin as a half thousandth of an inch, and being uniformly and thoroughly fastened to the inside of the container, has all of the necessary strength and impervious qualities, while at the same time providing a much superior finish and appearance, also lending itself to underlaid sheets, such as for coloring and enameling effects.

In some instances, such as for tobacco or cigar cans, the imprevious film may be placed over the label only on the outside of the container, instead of on the inside, and in that case, the inside may be lined with a softer material, such as rough paper, which may be previously soaked in tobacco juice, and the container may be formed while this soft lining is moist with the tobacco juice, so that when the cigars are inserted, and the container is sealed closed, it serves as a humidifier, sealing the moist air within the container until such time as it is opened. In such case, the impervious coverings applied to the heads or ends of the container would still preferably be on the inside thereof as described, especially where the same are formed of tin, for the purpose of preserving the same from the rusting effect of the moisture, though, of course the heads may also be covered externally to form a complete external impervious covering or coating.

The solvent is preferably in fact also a "filler". That is to say, I have found that by using a solvent or adhesive which has also a filler combined therewith, that the moisture-proof properties of the covering or lining are improved, probably for the reason that the cellulose is what might be termed cellular or porous under a microscope, and the filler by filling in the pores or cells of the sheet close them while the solvent fuses the sheet together, or fastens them when some other adhesive is used, the filler being forced into the cells or spaces by the pressure of the rollers during the laminating operation.

In the modification shown in Figs. 18 to 20 inclusive, the coating strip of film is laminated to the strip of card or board of which the container is made, with the margins of the film extending over opposite sides of the strip of board. For instance, by reference to Fig. 7 it will be observed that the film 53 extends over the board 51 at one side only. When laminating and fabricating as shown in Figs. 18 to 20 inclusive, the margins of the film strip extend over both sides of the board, and are turned over together, fused and sealed between the next lamination of board as shown in Fig. 20 wherein it will be observed that the reference character 53' indicates the strip of lining film, the inner lamination or winding of board being indicated by the reference character 85, and the outer winding or layer of board being indicated by the reference character 86. When the inner strip of board and film are united upon the mandrel looking at Fig. 20, the margin 53'' at the right is carried down by the margin 87 of the adjoining winding, the margin 87 of the adjoining winding being first preferably turned over as shown at 87 in Fig. 20, and having a solvent solution applied thereto, when it is pulled down taut over the margin 53'', the same fuse or knit together, forming a continuous integral wall 53 for lining of the can with the fused margins or laps sealed between the inner and outer spiralled walls of the container as shown, exposing inside of the can only the spiral crack or line 88.

In the modification shown in Figs. 21 and 22, instead of the can being made of a spiral winding of strip material, it is shown made of a direct or straight convolute winding, in which case a strip of film 88 is provided of a sufficient length of pass completely around the interior of the can to be made, a marginal portion 89 overlapping and fusing to the margin 90, so as to form a complete unitary integral lining or cylinder. To the opposite side of the film 88 is suitably secured an underlining of paper 91 which may be white or any other color and, showing through the film 88 produces an interior enameled effect. This lining paper 91 is backed by filler or card 92, the lining paper and card being of sufficient length according to the number of turns or convolutions intended for the wall of the container. At the outer end or margin 92' of the paper and board strip of label 93 is secured as shown, and at the opposite side a film strip as indicated at 94, so that after the paper and board 91, 92 have been wound, the same is followed by the label 93 covered by the film 94, the end margin 95 of which overlaps the margin at the opposite end, thus providing a container wall or cylinder laminated inside and out with film beneath the inner surface of which is a white or colored paper, and between which and the outer laminated label is provided the board filler.

Referring now more particularly to Figs. 23 to 28 inclusive, it will be observed that a strip of cardboard, metal or otherwise is indicated by the reference character 96, and is provided along its length at pre-determined intervals with circular holes such as 97. To one side of this perforated strip is secured a strip of film 98, after which it will be observed by reference to Fig. 25, that the laminated material is cut as indicated at 99, thus providing a series of transparent discs 100, laminated and secured to circular frames 101. These are now placed in a suitable die which forms the vertical flange 102, thus framing the central transparent film 100, the same extending upon the outside of the flange as indicated in Fig. 27. The container such as shown in Fig. 28 with its interior film 53', is now held in position in a suitable die or tool to receive the head shown in Fig. 27, which is now forced therein, the outer side of the flange 100 and top of the film lining 53' being moistened with suitable solvent, so that when the head 103 has been forced into the end of the cylinder, as shown in Fig. 28, the same becomes fused or hermetically sealed thereto, thereby providing a fluid-proof, transparent head closing one end of the cylindrical body of the container.

By reference again now to Fig. 21, it will be observed that when the cylinder wall is rolled in straight convolute manner, the margins 94, 94' of the film will extend above and below the body of the can. By now moistening the inside of these margins, and turning them over the top edge of the can, before pressing the head 103 into the end of the can, the top edge of the can will be covered or sealed, and will not absorb moisture, and the inner and outer film covering of the can will be joined or fused together, as well as the head 103.

In the modification shown in Fig. 29, a composite or laminated strip suitable for straight winding upon a mandrel is shown with parts broken away. 105 indicates the inner lining or film portion, 106 a colored paper thereunder, 107 the board or other body material, 108 the label, and 109 the outer lamination of film with margin 110 for sealing thereto. In forming a container such as shown in Fig. 30 of this composite strip, the board, label and paper are first laminated together and perforated and printed as indicated at 111, 112 and 113 so as to leave the opening 114 to be seen through the films 105 and 109, immediately above the printed bowl 115, thus providing a transparent window through the side of the container, through which the contents or food in the can can be readily observed, and simulating by the printed bowl 115, a bowl filled with the product thereof, thus providing an attractive method of merchandising, which gives the purchaser an opportunity of seeing the goods as they would appear in use.

The containers may be provided with a bail or handle 116 of conventional design, hooked into the perforated, domed disc 117, the prongs of which penetrate the wall 118 of the paper container, after which a piece of film 119 may be fused around the same, thus providing against any leakage of the container when used as a bucket after the contents have been withdrawn.

In the modification shown in Figs. 32 and 33, it will be observed that an outer head of tin 120 may be provided of conventional design beneath which may be provided the disc 121 of paper, and a disc 122 of film, the margins of the film or the top marginal and edge portions of the container 118 being moistened with solvent so as to insure fusion between the film head and wall of the container. The tin head is preferably cut out as indicated by the circular dotted line 123, and is also provided with guide lugs 124, and stops 125, beneath which the tin slide 126 may be guided when pulled or pushed by the rolled end 127. 128 indicates a bleed hole or vent so that in the use of the container by sliding back or rightwardly the slide 126, an apple corer may be forced down through the opening 123, thus removing the laminated plug of paper and film cut therefrom, and the point of the apple corer or knife may be pushed through the opening 128, thus providing a convenient outlet for the contents of the can, and after a predetermined amount has been removed, the slide may again be pushed leftwardly, again covering the opening 123, until the balance of the contents of the can is required. This provides a destructible form of container which cannot be reused in the same manner, thus insuring the one use for the original contents, thereby providing against fraudulent refilling.

Referring now more particularly to Figs. 34 and 35, it will be observed that the metal head 129 is depressed at the center, and is provided at its under surface with a paper disc 130 and film disc 131. The surface between the head film 131 and lining film 132 is suitably moistened, after which the head and discs are pressed into position as shown in Fig. 35, and then the metal disc 129 may be turned down and under as indicated in Fig. 38, or a double seam may be provided as indicated in Fig. 39 at 133.

In the modification shown in Figs. 36 and 37, a rectangular form of can is shown with a slide and opening similar to that illustrated in Figs. 32 and 33, except that the hole 123' is provided as near the corner as possible, and the same applies to the hole 123 in Fig. 33, the hole being snug up to the base of the flange, so that when the contents have been poured out, practically nothing remains in the container or can. Also of course, a vent hole 128' is preferably provided as shown, and of course a suitable handle 134 may be provided.

In the modification shown in Fig. 40, a paper or metal ring or washer 135 may be formed as shown with the paper or film disc 136, thus providing a suitable form of cover which may, if desired, be sealed to the film lining 137 where the same extends over the top edge, lapping beneath the film 136 as shown at 138. This is a desirable, cheap form of hermetically sealed package for nuts, potato chips, and other food products.

Figure 41:
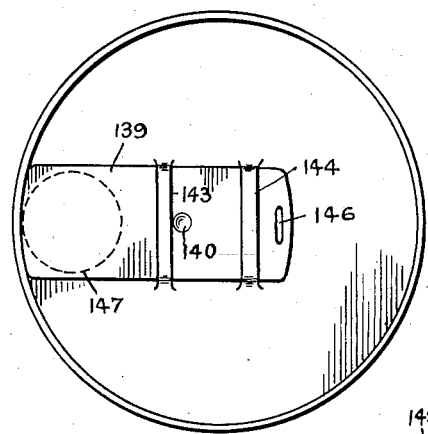
Figure 42:
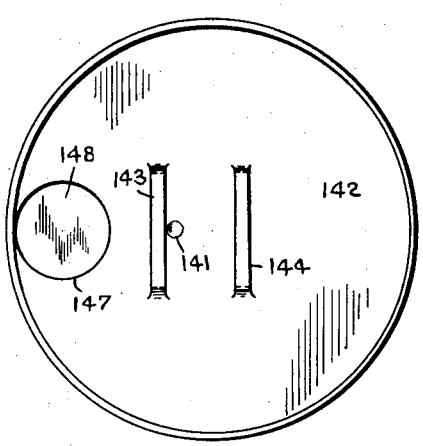
Figure 43:
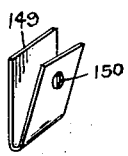
Figure 45:
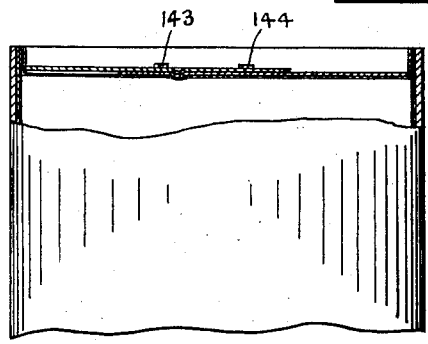

In the modification shown in Figs. 41 and 42, the slide 139 is provided with a depression 140 adapted to register with a depression 141 in the metal head 142 of the can, which metal head is also provided with upwardly pressed metal straps 143 and 144, beneath which the slide 139 may be pushed by the corrugation 146 extending upwardly therefrom, thus exposing or closing the hole 147, beneath which is the film 148 or paper disc or both, as may be found desirable, a section of the same, as shown in Fig. 41, being illustrated in Fig. 45.

Figure 44:
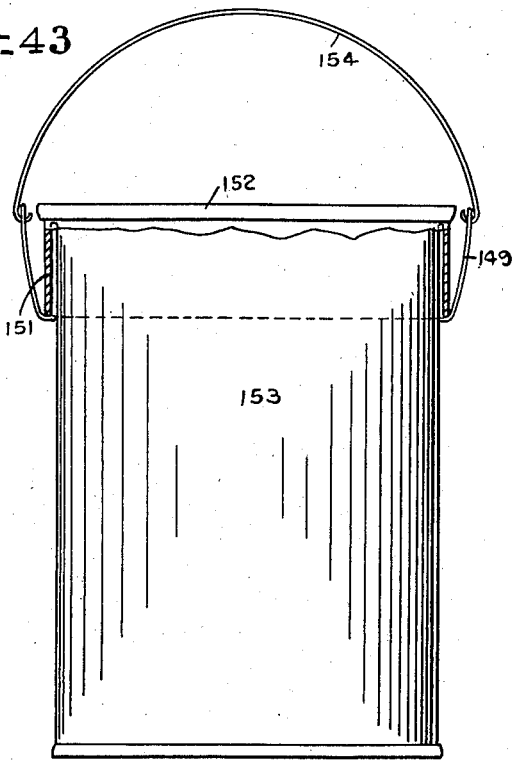

Referring now more particularly to Fig. 44 it will be observed that a metal clip 149 provided with hole 150 may be secured beneath the flange 151 of the cover 152, secured to the top of the container 153 or, instead of securing the clip 49 beneath a flanged cover, a ring in the composition of the flange 151, or lower down from the body of the can may be employed, thus providing a suitable anchorage for the handle 154.

Figure 46:
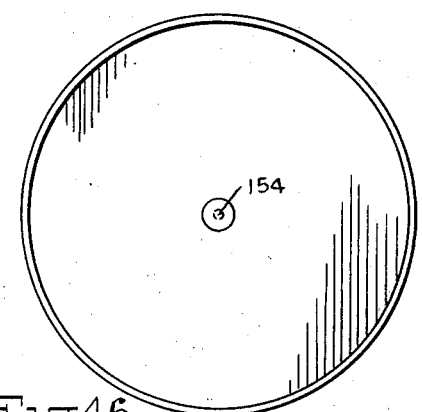

As a means for sealing these containers under vacuum, a small hole may be provided through the can or head thereof, as indicated at 154 in Fig. 46, and head thereto. For this purpose, a suitable magazine 156 is charged with suitable solvent 157 maintained at predetermined height through the flexible tube 158, with swivel connection 159. The bottom of this container consists of a screen-like or porous, annular diaphragm 160, beneath which is secured concentric rings 161, 162 of felt or other suitable absorbent material, the ring 161 having a lateral annular offset 163 at the top, engaging the annular cut away portion 164 of the ring 162, and these felt rings are preferably beveled as indicated at 165 and 166 to more readily separate and admit the vertical wall 167 of the container, said rings resting upon the annular flanges 168 and 169 of the magazine 156. Around the ring 161 is provided a split ring 170, having offsets 171 and 172, and within the inner ring 162 is another band or annular metallic ring 173 having offsets 174 and 175. A tension spring 176 is anchored to the offset 171, and extends around to the offset 174, while another similar spring 177 is anchored to the offset 172, and extends around the opposite direction to the offset 175. 178 indicates a screw rotatably mounted within the partition 179, and having a thread engaging the offset 174 and offset 175, so that upon turning the screw 178, the offsets 174, 175 move rightwardly or leftwardly together, with relation to the intervening fixed partition 179, thus increasing or decreasing the compression of the rings 161, 162, and thereby controlling the amount of solvent to be applied thereby to the top edge and margins of the can 167.

In the modifications shown in Figs. 49 to 51 inclusive, provision is made for the construction of containers of truncated cone form. For this purpose, a card or paper stock 180 is first run from the roll through dies which cut out the rectangular slots 181, 181', which it will be observed are slightly longer than the width of the curved portions 182 to be cut therefrom later. After the rectangular openings have been cut through the card, the same is then preferably laminated at opposite sides at opposite faces as indicated at 183, which is the top side of the sheet, and 184 indicating the under side and opposite face, the line 185 indicating the adjacent ends or margins of such laminations. In other words, looking at Fig. 49, the top right side is unlaminated, and likewise the lower left side, the inner edges of the lamination meeting at about the line 185. After being so laminated or covered with a suitable, preferably transparent colloid, the sheet is again run through a suitable cutting machine, which cuts out the sections 182 as far as the dotted lines 183', 183". This provides a series of circularly cut blanks having margins of colloid 184', which extend from the ends thereof, the cutting being along the curved lines 182 and dotted lines 183', 183". This provides blanks for truncated cone shaped containers, such as shown in Figs. 51, 52. A blank may now be wound upon a tapered mandrel, both the margins of the film being suitably wetted or coated with a material having slightly solvent properties, containing a filler, and at the same time, adhesive properties. The filler serves to fill the interstices of the cellulose sheet, and at the same time softens the surface of the same, so that it will fuse, splice, or knit with the surface lamination to which it is applied, at the same time causing a tight binding or sticking together of the parts. Such an arrangement is shown in Fig. 50, where it will be observed that the inner end 185 is secured to the inner lamination, and the outer end 186 to the outer lamination, the unlaminated board or sheet being wrapped upon itself between the coils or wrappings of the cone, where the same are of course pasted preferably with the same material as previously explained.

Any suitable bottom such as indicated at 186' may be applied after the top has been formed, and preferably after the container has been filled. In forming the top, a disc of film 187, of larger diameter than the top, is first preferably laid thereupon, after which a ring of card 188 snugly engaging the top, is forced down over the same as shown, thus drawing tightly upon the disc 187, and forming a tight, transparent head or membrane, through which the contents of the container may be seen. The ring 188 is preferably not forced down all the way, but is left projecting sufficiently for the paper disc or plug 189 to be seated therein upon the top edge of the container as shown. This provides a desirable form of bottle, such as for milk, allowing for the ready removal of the plug or disc 189, after which the drum head or film 187 is cut and likewise removed, and this film may of course be embossed with a seal or otherwise for preventing "bootlegging" the contents, as the consumer will readily discover the fracture of the membrane or film, and refuse the bottle.

These bottles are preferably filled invertedly, that is, from the bottom, after which the bottom may be readily headed or seamed with a suitable end of paper or metal of any of the well-known types, as may be desired.

Of course it will be understood that various modifications may be made in the construction and arrangement of parts, and in the formula disclosed, without departing from the spirit of the invention as claimed.

I claim:

1. The method of forming the wall of a container of the class described consisting in providing a sheet of flexible material, applying to opposite ends of opposite sides thereof sheets of other material, rolling one end within the other, and securing the free ends of said applied sheets together.

2. The method of forming the wall of a container of the class described consisting in providing a sheet of flexible material, applying to opposite ends of opposite sides thereof sheets of other material, rolling one end within the other, and securing the free ends of said applied sheets together, the adjacent free ends of said applied material overlapping at opposite sides of said flexible material, and the opposite ends of said applied material overlapping upon each other.

3. The method of forming the wall of a container of the class described consisting in providing a sheet of flexible material, applying to opposite ends of opposite sides thereof sheets of other material, rolling one end within the other until the ends are about in alignment and then securing the several sheets.

4. The method of forming a container of the class described consisting in providing a flexible body sheet, laminating the same at opposite ends and opposite sides with sheets of other material, rolling same until the ends of the body sheet are about in alignment, securing the same, and applying heads to the rolled wall thus formed.

5. The method of forming a container of the class described consisting in providing a flexible body sheet, laminating the same at opposite ends and opposite sides with sheets of other material, rolling same until the ends of the body sheet are about in alignment, securing the same, and applying heads to the rolled wall thus formed, one head being permanently secured and the other removable.

6. The method of forming a container of the class described consisting in providing a flexible body sheet, laminating the same at opposite ends and opposite sides with sheets of other material, rolling same until the ends of the body sheet are about in alignment, securing the same, and applying heads to the rolled wall thus formed, said sheets being laminated in a continuous strip and cut therefrom in predetermined lengths.

7. The method of forming a container of the class described consisting in providing a flexible body sheet, laminating the same at opposite ends and opposite sides with sheets of other material, rolling same until the ends of the body sheet are about in alignment, securing the same, and applying heads to the rolled wall thus formed, the outer margins of said laminating sheets extending beyond said body sheet and turned over and secured thereupon.

8. The method of forming a paper container of the class described consisting in applying to the paper thereof a sheet of hygroscopic material, applying an intervening material having filler and adhesive properties, and forcing the latter into the former by pressure.

9. The method of producing a laminated structure that comprises the steps of joining a sheet of paper or the like to a sheet of hygroscopic material which comprises applying between the sheets of paper and hygroscopic material an intervening material having filling and adhesive properties and pressing the sheets together to force the intervening material thereinto.

FRANCIS P. McCOLL.